(12) United States Patent  
Pezeshki et al.

(10) Patent No.: US 12,367,483 B1  
(45) Date of Patent: Jul. 22, 2025

(54) DECENTRALIZED AUTHORIZATION

(71) Applicant: Unstoppable Domains Inc., Las Vegas, NV (US)

(72) Inventors: Braden River Pezeshki, Reno, NV (US); Matthew Everett Gould, Reno, NV (US)

(73) Assignee: Unstoppable Domains Inc., Las Vegas, NV (US)

( * ) Notice: Subject to any disclaimer, the term of this patent is extended or adjusted under 35 U.S.C. 154(b) by 178 days.

(21) Appl. No.: 17/897,984

(22) Filed: Aug. 29, 2022

Related U.S. Application Data

(60) Provisional application No. 63/238,588, filed on Aug. 30, 2021.

(51) Int. Cl.
*G06Q 20/36* (2012.01)
*G06Q 20/38* (2012.01)
*G06Q 20/40* (2012.01)

(52) U.S. Cl.
CPC ..... *G06Q 20/3674* (2013.01); *G06Q 20/3825* (2013.01); *G06Q 20/3829* (2013.01); *G06Q 20/389* (2013.01); *G06Q 20/4014* (2013.01); *G06Q 20/4015* (2020.05); *G06Q 2220/00* (2013.01)

(58) Field of Classification Search
CPC ........... G06Q 20/3674; G06Q 20/3825; G06Q 20/3829; G06Q 20/389; G06Q 20/4014; G06Q 20/4015; G06Q 2220/00
See application file for complete search history.

(56) References Cited

U.S. PATENT DOCUMENTS

| | | | | |
|---|---|---|---|---|
| 11,012,437 | B2 * | 5/2021 | Yoakum | H04L 63/083 |
| 11,314,891 | B2 * | 4/2022 | Hennebert | G06F 21/6245 |
| 2005/0165684 | A1 * | 7/2005 | Jensen | G06Q 20/425 |
| | | | | 705/44 |
| 2014/0215587 | A1 * | 7/2014 | Burch | H04W 12/04 |
| | | | | 726/6 |
| 2014/0237564 | A1 * | 8/2014 | Dudziak | H04L 63/08 |
| | | | | 726/6 |
| 2019/0243861 | A1 * | 8/2019 | Jheeta | G06Q 10/00 |
| 2019/0294817 | A1 * | 9/2019 | Hennebert | H04L 9/0861 |
| 2021/0385085 | A1 * | 12/2021 | Wang | H04L 9/0833 |

(Continued)

FOREIGN PATENT DOCUMENTS

WO WO-2021178900 A1 * 9/2021 ........... G06Q 30/018

OTHER PUBLICATIONS

N. Sakimura; Final_ OpenID Connect Core 1.0 incorporating errata set 1. (Year: 2014).*

(Continued)

*Primary Examiner* — Neha Patel  
*Assistant Examiner* — Jahed Ali  
(74) *Attorney, Agent, or Firm* — Van Pelt, Yi & James LLP

(57) ABSTRACT

An identifier of a blockchain token associated with an authorized user of the blockchain token requesting to log in to access a service is received. Based on the blockchain token, an authorization server that verifies a signature associated with the authorized user of the blockchain token is contacted. An authorization from the authorization server that verified the signature is received. Based on the received authorization, the authorized user of the blockchain token is allowed to log in to the service.

20 Claims, 11 Drawing Sheets

(56) References Cited

U.S. PATENT DOCUMENTS

| | | | | |
|---|---|---|---|---|
| 2021/0391992 A1* | 12/2021 | Schiffman | ............... | G06F 21/33 |
| 2023/0034169 A1* | 2/2023 | Ferenczi | ............. | H04L 63/0823 |
| 2023/0042508 A1* | 2/2023 | Agarwal | ............. | H04L 67/1097 |
| 2023/0316263 A1* | 10/2023 | Eby | ....................... | H04L 9/0825 |

OTHER PUBLICATIONS

Author Unkown, "What is WebFinger?", obtained from <https://web.archive.org/web/20210812050711/https://webfinger.net/> on Aug. 29, 2022; published Aug. 12, 2021.

Jones et al., "WebFinger", obtained from <https://datatracker.ietf.org/doc/html/rfc7033> on Aug. 29, 2022; published Sep. 2013.

Sakimura et al., "OpenID Connect Core 1.0 incorporating errata set 1", obtained from <https://openid.net/specs/openid-connect-core-1_0.html> on Aug. 29, 2022; published Nov. 8, 2014.

Sakimura et al., "OpenID Connect Discovery 1.0 incorporating errata set 1", obtained from <https://openid.net/specs/openid-connect-discovery-1_0.html> on Aug. 9, 2022; published Nov. 8, 2014.

* cited by examiner

*Example WebFinger Blockchain Domain Records:*

{
  "webfinger": {
    "alice": { "https://example.com/webfinger/rel":
"{\"uri\":\"ipfs://Qme7ss3ARVgxv6rXqVPiikMJ8u2NLgmgszg13pYrDKEoiu\"}",
    "bob": {"https://example.com/webfinger/rel": {\"host\":\"example.com\"}"},
    "charlie": {"https://example.com/webfinger/rel": {\"value\":\"{... Webfinger JRD Doc...}\"}"}
  }
}

FIG. 9

*Example Webfinger DNS Records*

| Name | Type | Value |
|---|---|---|
| webfinger | TXT | BASE64 encoded Document from above example |

FIG. 10

*Example Authentication Blockchain Domain Records:*

```
{
  "authentication": {
    "alice":
"{\"addr\":\"0x1234567890123456789012345678901234567890\",\"addr_type_hint\":\"web3\"}",
    "bob": "{\"jwks\":\"{\"keys\":[...]}\"}",
    "charlie":
"{\"jwks_uri\":\"ipfs://Qme7ss3ARVgxv6rXqVPiikMJ8u2NLgmgszg13pYrDKEoiu\"}"
  }
}
```

Those records would correspond to the user "alice@domain.tld".

FIG. 11

DECENTRALIZED AUTHORIZATION

CROSS REFERENCE TO OTHER APPLICATIONS

This application claims priority to U.S. Provisional Patent Application No. 63/238,588 entitled DECENTRALIZED AUTHORIZATION filed Aug. 30, 2021 which is incorporated herein by reference for all purposes.

BACKGROUND OF THE INVENTION

User authentication allows an application such as a web application to provide a custom experience dedicated to the user. For example, by identifying the user accessing an application, the application can tailor the user experience for the specific user including by presenting information specific to the user. The specific information can include the user's personal information and preferences such as an email address and name. To protect each user's personal information from being revealed to others, each user can be authenticated individually. Traditionally, user authentication is accomplished by providing a username and password combination. The authentication can be performed by the application or by a centralized authorization service.

BRIEF DESCRIPTION OF THE DRAWINGS

Various embodiments of the invention are disclosed in the following detailed description and the accompanying drawings.

FIG. 9 is a diagram of an embodiment of WebFinger blockchain domain records.

FIG. 10 is a diagram of an embodiment of WebFinger DNS Records.

FIG. 11 is a diagram of an embodiment of authentication blockchain domain records.

DETAILED DESCRIPTION

Figure 1:
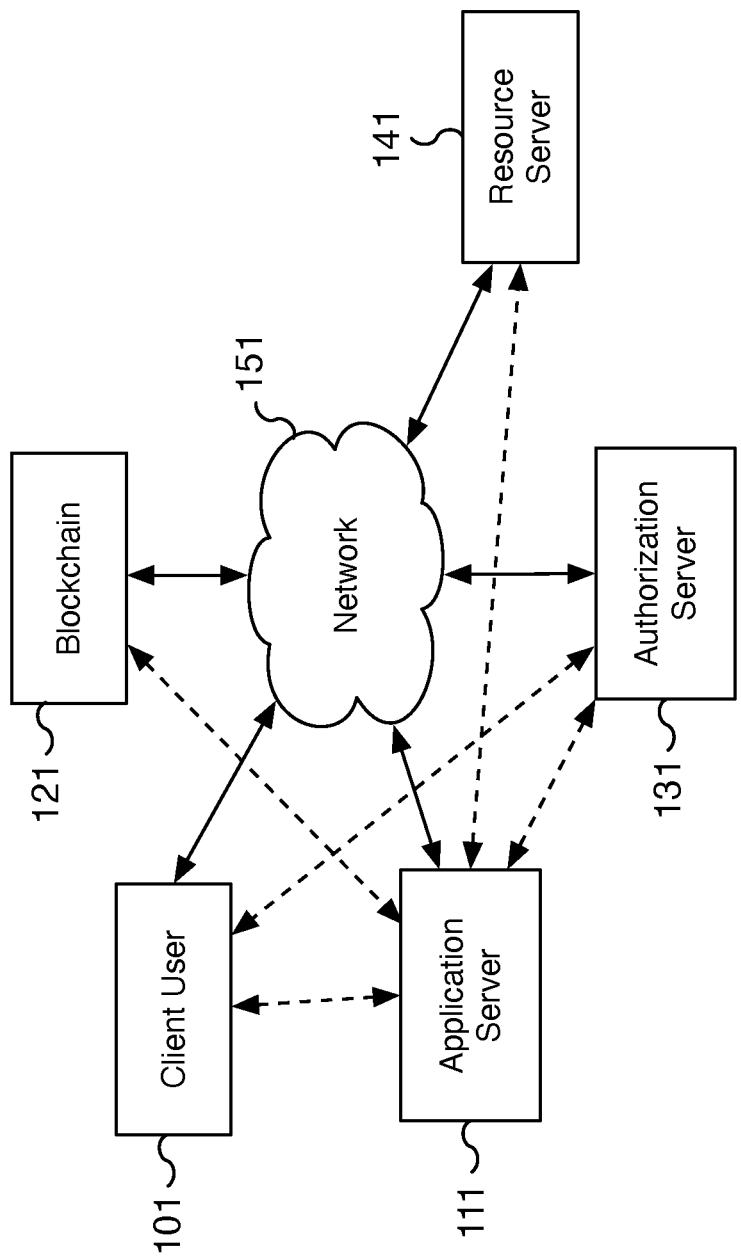
FIG. 1 is a block diagram illustrating an embodiment of a decentralized authentication platform.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Decentralized authorization is disclosed. Using the disclosed techniques and systems, a user can be authorized using a decentralized authentication platform that does not rely on or require trusting a centralized authorization server. In various embodiments, a user provides an identifier such as a non-fungible token (NFT) domain or NFT identifier associated with a blockchain token. For example, an NFT domain or identifier is a blockchain token associated with the authorized user and is utilized as an identifier for the authorized user. Moreover, the user can utilize the NFT identifier as a user identifier when accessing digital resources such as digital resources associated with a network application. Example network applications include web applications, decentralized applications, and/or Web3 applications, among others. In various embodiments, the blockchain token is associated with both an authorization server and one or more authorized users and/or authorization records. When an NFT identifier is provided as an identifier for authorization, the associated authorization server is contacted and asked to authorize the user of the provided NFT identifier. In various embodiments, only an authorized user associated with the NFT identifier is able to provide a valid signature for the NFT identifier. For example, the signature can be an owner signature or one authorized in an authorization record associated with the blockchain token. In various embodiments, only an authorized user has the private cryptographic key associated with the public cryptographic key or address assigned to the NFT identifier. Once a signature is verified by the configured authorization server, the authorization server provides authorization of the user to the requesting application. For example, an authorization token can be provided that allows the requesting application to access digital resources associated with the user. In some embodiments, the authorization token allows the requesting application to access digital resources associated with the user from another server, such as a resource server.

In some embodiments, an identifier of a blockchain token associated with an authorized user of the blockchain token requesting to log in to access a service received. For example, a blockchain token is minted on a blockchain and associated with cryptographic keys of the authorized user. The authorized user of the blockchain token, which can be a non-fungible token (NFT) domain, provides the NFT domain to log in to an application service hosted on an application server. Example applications include decentralized applications, Web3 applications, and traditional web applications, among others. The NFT domain is used to access digital resources associated with the user and/or application service. In some embodiments, based on the blockchain token, an authorization server that verifies a signature associated with the authorized user of the blockchain token is contacted. For example, a third-party authorization server separate from the accessed application is contacted to verify the authorized user. In some embodiments, an authorization from the authorization server that verified the signature is received. For example, once the authorization server verifies that the signature associated with the blockchain token is valid, an authorization token or another form of authorization is provided to the application server. In some embodiments, based on the received authorization, the authorized user of the blockchain token is allowed to log in to the service. For example, once the user is authorized, the user is able to log into the application service and the application service is allowed to access digital resources associated with the authorized user. In some embodiments, the digital resources are hosted at a location different than the application server, such as on a separate resource server. For example, a provided authorization token can be used to access the digital resources hosted on a separate resource server hosted by or at the direction of the authorized user or another entity.

In some embodiments, an extension of an identity layer (e.g., OpenID Connect (OIDC)) allows owners of a domain of a naming service to authorize access to information and resources. When combined with a blockchain-based domain system, the extension enables decentralized authorization. For example, an owner of a non-fungible token (NFT) domain can access information and resources using the NFT domain for decentralized authorization. Examples of the blockchain-based domain system can be found in U.S. patent application Ser. No. 17/321,102 entitled RESOLVING AND MANAGING BLOCKCHAIN DOMAINS filed May 14, 2021, which is incorporated herein by reference for all purposes.

FIG. 1 is a block diagram illustrating an embodiment of a decentralized authentication platform. In the example shown, the decentralized authentication platform includes client user 101, application server 111, blockchain 121, authorization server 131, resource server 141, and network 151. Client user 101 is a network client used to access an application service such as a web application hosted by application server 111. In some embodiments, the application service hosted by application server 111 is a decentralized service and/or a Web3 application. The user of client user 101 accesses application server 111 and provides an identifier such as a non-fungible token (NFT) domain associated with a blockchain token. Application server 111 accesses the associated blockchain token stored on blockchain 121. The blockchain token is configured to require authentication using a configured decentralized authentication/authorization server such as authorization server 131.

For example, in some embodiments, the configuration is stored on blockchain 121 using one or more blockchain records. In various embodiments, application server 111 utilizes the authentication method configured for the provided identifier. For example, for an NFT domain provided by client user 101 to application server 111 that is configured to use authorization server 131, application server 111 requests authorization server 131 to authenticate the user of client user 101. Once authenticated, authorization server 131 provides application server 111 proof of authentication, such as an authentication token. The authentication proof can be used to access digital resources associated with the authenticated user. In some embodiments, the digital resources are stored on resource server 141 and accessed by application server 111 via resource server 141 using a provided authentication token. In various embodiments, network 151 is the Internet.

In some embodiments, client user 101 is a network client used by a user to access an application service such as a service hosted by application server 111. Client user 101 can be a computing device such as a laptop, mobile device, desktop, or another network computing client. In some embodiments, a user of client user 101 can access the user's cryptographic wallet configured for a provided identifier, such as an NFT domain or NFT identifier, from client user 101. The cryptographic wallet can be used by the user of client user 101 to sign a signature request provided by authorization server 131 for authenticating the user to application server 111.

In some embodiments, application server 111 hosts an application service for clients. Users can log into the service hosted by application server 111 by providing a user identifier associated with a blockchain token. In various embodiments, the user identifier is an NFT domain and the associated blockchain token that is minted on blockchain 121. In order to provide access for a specific user, the user authenticates by first providing the identifier to application server 111 and then a cryptographic signature to the user's configured authorization server, such as authorization server 131. The signature must be signed using a cryptographic key associated with the provided identifier's blockchain token. In some embodiments, a pop-up window or another user interface element is displayed to client user 101 by application server 111 for providing the user's identifier.

In some embodiments, blockchain 121 is used to mint a blockchain token and to store the authentication configuration for an associated NFT identifier, such as an NFT domain. In some embodiments, blockchain 121 is a public ledger and can be distributed across multiple computing devices. In various embodiments, a blockchain token is associated with one or more blockchain records stored on blockchain 121. For example, a blockchain record can store the identity of one or more decentralized authorization servers such as authorization server 131 for authenticating the associated NFT identifier as well as a cryptographic public key or address used to validate requested signatures. In some embodiments, the blockchain record stores one or more authentication records that specify one or more cryptographic public keys, addresses, or alternative authentication methods for authenticating the associated NFT identifier. In various embodiments, blockchain 121 may be a multi-layer blockchain.

In some embodiments, authorization server 131 is an authorization server for authenticating users. Authorization server 131 is a decentralized authorization server and is selected for usage by configuring an associated NFT domain and/or corresponding blockchain token. For example, each user configures an authorization server to use when configuring the user's NFT domain and associated blockchain token. In some embodiments, a default authorization server exists and can be used in the event the user does not specify an authorization server. Although only a single authorization server is shown in FIG. 1, additional authorization servers can exist, and different authorization servers can be configured for use for different NFT identifiers. In various embodiments, authorization server 131 provides proof of user authentication such as via an authentication token once a user has been authenticated. The authentication can be performed by providing a valid signature associated with a blockchain token.

In some embodiments, resource server 141 is a server for storing digital resources associated with a user identifier such as an NFT domain. The user's digital resources are only accessible after a user has been authenticated by an authorization server. For example, digital resources associated with a user are only accessible from resource server 141 when a request includes a valid authentication token generated by authorization server 131. In particular embodiments, resource server 141 is used to store and update user personal information and preferences and is accessible by application server 111 once the user has been authenticated.

In the diagram of FIG. 1, client user 101, application server 111, blockchain 121, authorization server 131, and resource server 141 are each communicatively connected to one another via network 151. The solid bi-directional arrows between each of client user 101, application server 111, blockchain 121, authorization server 131, and resource server 141 to network 151 represent network connectivity via network 151. The dashed bi-directional arrows between the different components of FIG. 1 correspond to two different network endpoints of a network connection established via network 151. The connections represented by the dashed bi-directional arrows correspond to network connections used for the decentralized authentication to a user of client user 101 when accessing a service hosted by application server 111.

Figure 2:
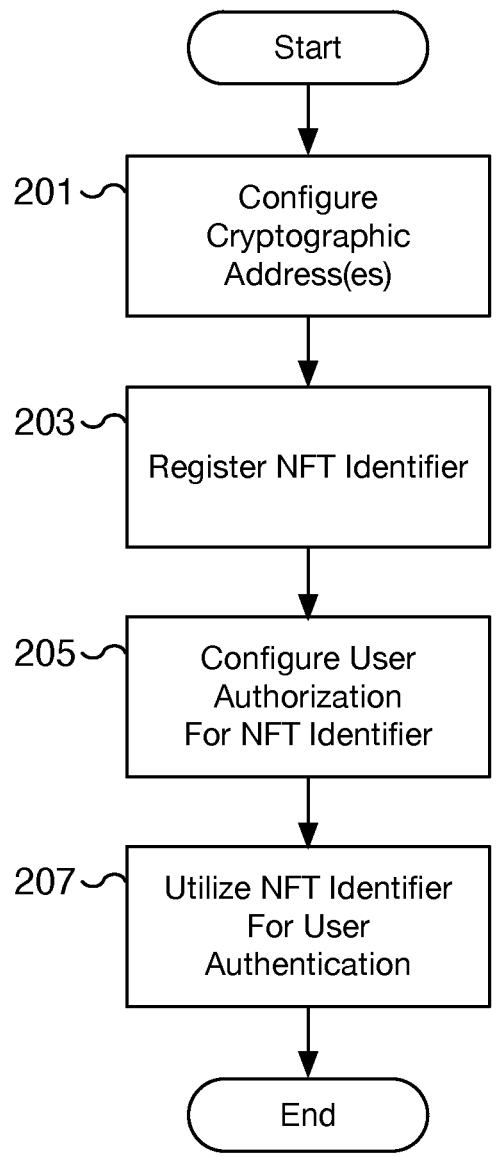
FIG. 2 is a flowchart illustrating an embodiment of a process for decentralized authorization.

FIG. 2 is a flowchart illustrating an embodiment of a process for decentralized authorization. For example, a user can present an NFT identifier associated with a blockchain token as a form of user identification. The decentralized authorization server can validate that the NFT identifier is associated with the user when provided with an authorized signature by the user that is associated with the NFT identifier. Once the user is validated, the user authorization can be used to access digital resources associated with the authenticated user. For example, an application service can authenticate a user using the disclosed decentralized authentication platform and then access and provide the user with personal information and preferences. In some embodiments, the decentralized authorization is performed using the decentralized authentication platform of FIG. 1. For example, a user of client user 101 of FIG. 1 can access application server 111 of FIG. 1 by authenticating an NFT identifier associated with blockchain 121 of FIG. 1 using authorization server 131 of FIG. 1. In some embodiments, the digital resources associated with an authenticated user are stored on resource server 141 of FIG. 1.

At 201, one or more cryptographic addresses are configured. For example, a user configures one or more cryptographic addresses used to mint and/or authenticate an NFT identifier. In some embodiments, a cryptographic address is a blockchain address and is associated with a public/private cryptographic key pair and/or a cryptographic wallet. As part of the configuration processes, an owner cryptographic address can be generated and later used to mint and/or configure an NFT identifier. Similarly, once configured, the owner address can be used to authenticate a user associated with the NFT identifier. In some scenarios, additional cryptographic addresses can be configured along with the owner cryptographic address to manage, operate, and/or authenticate the user. For example, one or more additional cryptographic addresses can be configured and later used to authenticate the NFT identifier in addition to the owner address. These additional addresses allow the owner to safely store the associated private key of the owner address and utilize one or more separate pairs of cryptographic keys for specific uses such as authenticating a user associated with the NFT identifier. In the event the owner decides to retire one of the additional keys, such as one of the dedicated authentication keys, for example, in the event a key is no longer trusted, additional keys including the owner's private key are still valid.

At 203, an NFT identifier is registered. For example, an NFT identifier such as an NFT domain is registered using a cryptographic address configured at 201. In various embodiments, the NFT identifier is a unique identifier and using the disclosed techniques and systems can be utilized for decentralized authorization of a user. As part of the registration process, the NFT identifier is minted to a blockchain and associated with a blockchain token. Minting the NFT identifier on a blockchain establishes a form of ownership of the NFT identifier. For example, in various embodiments, the associated blockchain used for minting the NFT identifier is a public ledger and allows others to determine ownership of the NFT identifier based on the cryptographic address used for minting. In some embodiments, the blockchain associated with the NFT identifier utilizes multiple blockchain layers, for example, for increased performance and/or efficiency.

In some embodiments, the NFT identifier registration process utilizes a cryptographic wallet to establish ownership. For example, a cryptographic wallet configured with an owner cryptographic address and associated public/private key pair may be used to mint an NFT identifier to an associated blockchain. In various embodiments, the cryptographic address used to mint the NFT identifier on the blockchain and associate the NFT identifier with a blockchain token is an owner cryptographic address configured at 201.

At 205, user authorization for an NFT identifier is configured. For example, the NFT identifier registered at 203 using a cryptographic address configured at 201 is configured at 205 for decentralized user authorization. In some embodiments, one or more authorization servers and/or authentication methods are configured for the NFT identifier. The specified authorization servers can be configured using a blockchain record. For example, a blockchain record associated with the NFT identifier and associated blockchain token can specify which authorization servers are approved for authenticating the NFT identifier with a user. In some embodiments, a configured authorization server is determined by resolving WebFinger information. For example, authorization server information can be specified by storing WebFinger information on the blockchain to resolve a WebFinger request. The WebFinger request can be used to determine a configured authorization server by resolving the information by request, by reference, and/or by value. In addition to specifying an authorization server, the NFT identifier can be configured to utilize different authorization methods. For example, the NFT identifier can be configured to be authenticated using owner-based authentication and/or records-based authentication. When configured for owner-based authentication, the user signs an authentication message request provided by a configured authorization server. When configured for records-based authentication, an authentication record specifies what other authentication methods are approved, including the use of non-owner cryptographic addresses to authenticate the NFT identifier.

At 207, the NFT identifier is utilized for user authentication. For example, once configured for user authentication, an NFT identifier can be specified by a user when accessing an application service. When the NFT identifier is provided, the application server will resolve which authorization server to utilize for user authentication. The application server contacts the authorization server and redirects user authorization to be performed between the user client and the authorization server. Once the user authenticates using one of the authentication methods configured for the NFT identifier, the application service is provided with proof of authentication, such as with an authentication token.

Figure 3:
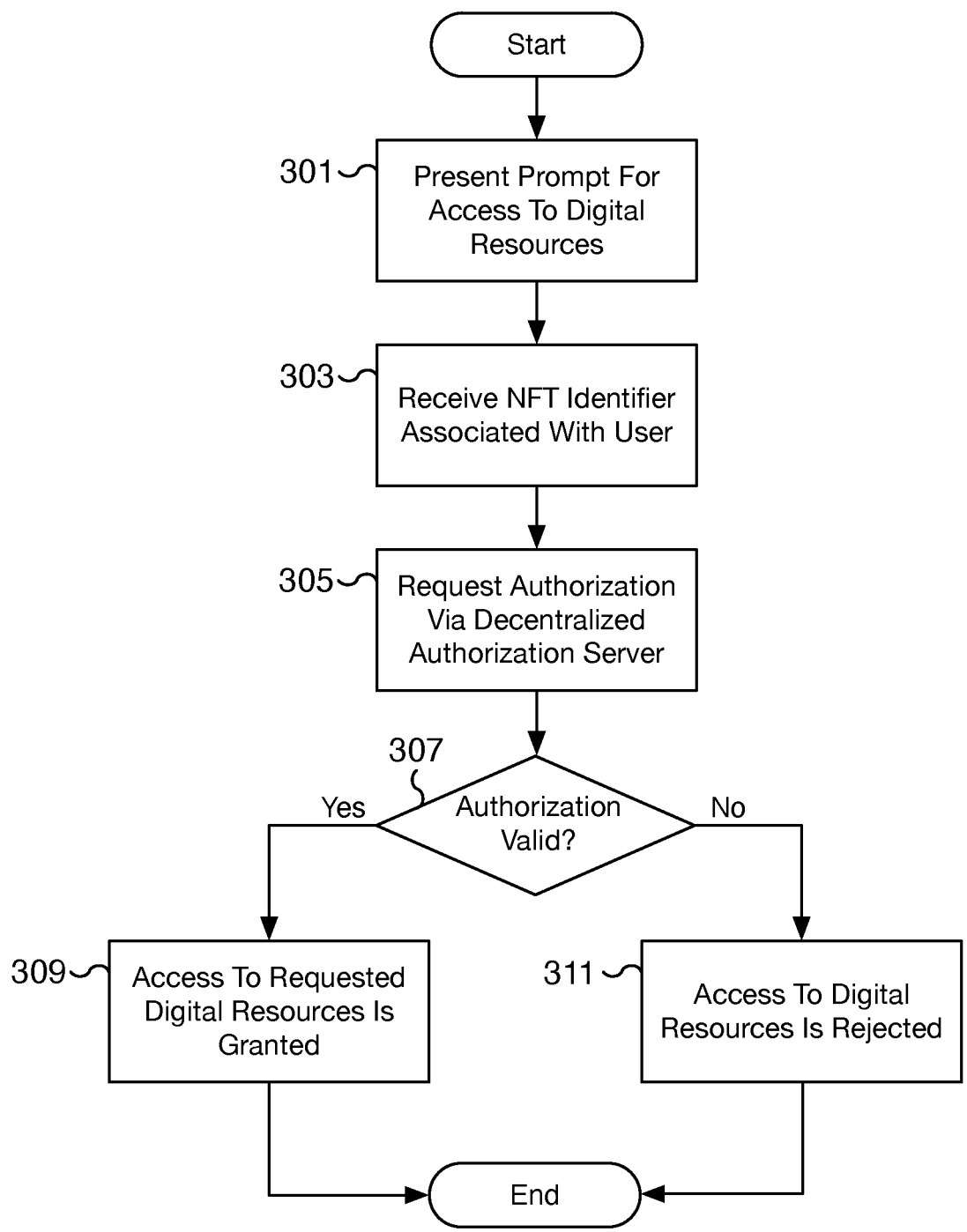
FIG. 3 is a flowchart illustrating an embodiment of a process for utilizing an NFT identifier for decentralized user authentication.

FIG. 3 is a flowchart illustrating an embodiment of a process for utilizing an NFT identifier for decentralized user authentication. For example, an application server hosting an application service can utilize the process of FIG. 3 to authenticate a client user using a decentralized authorization server. In some embodiments, the user is a user of client user 101 of FIG. 1, the application server is application server 111 of FIG. 1, and the decentralized authorization server is authorization server 131 of FIG. 1. In various embodiments, the user provides an NFT identifier configured for user authentication using the process of FIG. 2 and the NFT identifier is minted on a blockchain such as blockchain 121 of FIG. 1. In some embodiments, the process of FIG. 3 is performed at 207 of FIG. 2.

At 301, a prompt for access to digital resources is presented. For example, integrated into an application service is a user interface component presented to the user for entering a user identifier such as an NFT identifier. When prompted with the user interface component, such as a login dialog, the user can enter an associated NFT identifier to authenticate the user. In various embodiments, the NFT identifier is an NFT domain. In some embodiments, the user prompt and associated functionality are implemented by a third-party library utilized by the application service. For example, an application service can utilize a user authentication library with login capabilities that performs decentralized user authentication.

At 303, an NFT identifier associated with a user is received. For example, in response to the prompt presented at 301, the user enters an NFT identifier. At 303, the NFT identifier provided by the user is received. In various embodiments, the NFT identifier is an NFT domain.

At 305, authorization via a decentralized authorization server is requested. For example, using the NFT identifier provided at 303, authorization for a user associated with the NFT identifier is requested by submitting a user authorization request to a decentralized authorization server. In various embodiments, the application server determines the decentralized authorization server configured for the provided NFT identifier by examining the associated blockchain token. For example, the decentralized authorization server configured for the NFT identifier can be determined by accessing the blockchain associated with the NFT identifier. Using the determined authorization server, an authorization request is transmitted to the authorization server to authenticate the user associated with the NFT identifier. In some embodiments, the authorization request includes a set of permissions for which access is requested. For example, the request can include access to a user's email address, account balance, a history of user activity, a phone number, an account profile, a user social media account, user reputation metrics, and/or other access restricted digital resources. The access request can include the type of request, such as read access, write access, one-time access, time-based access, or another type of access. In some embodiments, an NFT identifier is not configured with a specific decentralized authorization server and one or more default authorization servers are selected and used for authorization.

At 307, a determination is made whether the authorization is valid. In the event the authorization is valid, processing proceeds to step 309. In the event the authorization is invalid, processing proceeds to step 311.

At 309, access to requested digital resources is granted. For example, the authorization server has authorized the user. Once authorized, the application server is granted access to digital resources associated with the user. In some embodiments, an authorization token is provided by the authorization server when the user properly authenticates. For example, using a provided authentication token, the user and application server can access digital resources associated with the user. In some embodiments, the authentication is limited to a certain defined set of digital resources. For example, an authentication token may provide access to a user's email address and account balance but not the user's home address, phone number, and account activity. In some embodiments, the access limitations are determined by the user when authenticating with the authorization server. For example, the granularity of digital resource access can be controlled by the user and a user has to specifically grant access to digital resources based on a set of permissions included in the authorization request.

At 311, access to requested digital resources is rejected. For example, a signature provided by the user does not correspond with a public cryptographic key or address configured for the NFT identifier. In the event the authorization server is unable to validate the user, the authorization request is denied and access to the requested digital resources is rejected.

Figure 4:
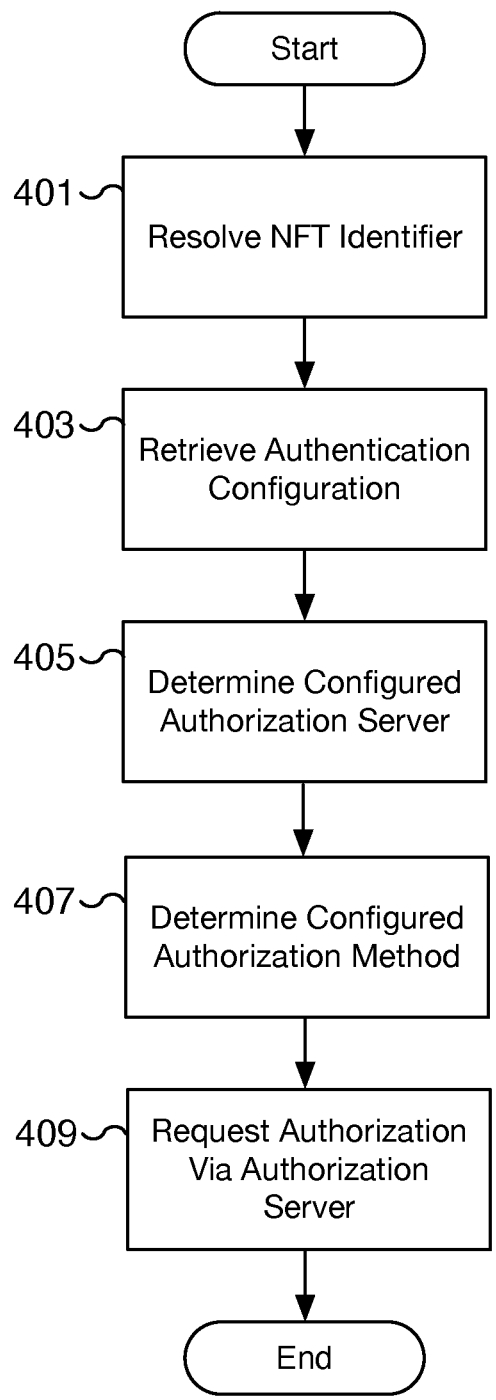
FIG. 4 is a flowchart illustrating an embodiment of a process for utilizing an NFT identifier for decentralized user authentication.

FIG. 4 is a flowchart illustrating an embodiment of a process for utilizing an NFT identifier for decentralized user authentication. For example, an application server hosting an application service, such as a web service, a decentralized service, Web3 application, or another appropriate service, can utilize the process of FIG. 4 when provided with an NFT identifier for user authentication. The application server determines the authentication configuration associated with the NFT identifier and requests authorization of the user via a configured authorization server. In various embodiments, the process of FIG. 4 is performed by an application server such as application server 111 of FIG. 1. In some embodiments, the user is a user of client user 101 of FIG. 1, the application server is application server 111 of FIG. 1, and the decentralized authorization server is authorization server 131 of FIG. 1. In some embodiments, the NFT identifier is minted on a blockchain such as blockchain 121 of FIG. 1. In some embodiments, the process of FIG. 4 is performed at 207 of FIG. 2 and/or at 303 and/or 305 of FIG. 3.

At 401, an NFT identifier is resolved. For example, an NFT identifier such as an NFT domain is associated with a blockchain token with information stored on a public blockchain. At 401, the NFT identifier is resolved to determine at least a cryptographic address and configuration information related to authentication as configured for the NFT identifier. In some embodiments, the resolution requires accessing a blockchain registry that maps the NFT identifier to configuration information including ownership data, owner data, and authentication configuration records. In some embodiments, the resolution involves accessing a second-level blockchain associated with the primary blockchain for the NFT identifier.

At 403, the authentication configuration associated with the NFT identifier is retrieved. For example, one or more authentication records storing authentication configuration information are retrieved. The authentication records can store information related to the authentication server, such as a location of the authorization server, that should be utilized when authorizing a user associated with the NFT identifier. In some embodiments, the authentication records store information such as metadata for initiating additional requests to retrieve additional authentication configuration information. For example, a blockchain authentication record associated with the NFT identifier can store information for constructing a WebFinger request. In various embodiments, the information for constructing a WebFinger request can be stored in a variety of formats to initiate a WebFinger request by request, by reference, or by value.

At 405, a configured authorization server is determined. For example, using the authentication configuration information retrieved at 403, an authorization server is determined for use in authenticating a user associated with the NFT identifier. In various embodiments, the authorization server is a decentralized authorization server. In the event no specific authorization server is configured for the NFT identifier, a default authorization server can be utilized. In some embodiments, information describing the authorization server, including information related to its location, is retrieved using an information discovery protocol such as WebFinger. The configured authorization server can be provided as part of a WebFinger JSON Resource Descriptor document or using another standardized format. For example, the information retrieved via WebFinger can include the location, such as a network address, of the authorization server.

At 407, a configured authorization method is determined. In various embodiments, using the authentication configuration information retrieved at 403, the authorization method configured for the NFT identifier is determined. For example, an NFT identifier can be configured to be authenticated using a variety of authentication methods, such as by owner signature, by another authorized signature, or by another specified authentication method. In some embodiments, the authentication method is records based and allows NFT identifiers owned by multi-signature wallets to specify an authorized private key for authentication.

At 409, authorization is requested via an authorization server. For example, a user authorization request is transmitted by the application server to the authorization server determined at 405. In some embodiments, the authorization request includes a specific set of requested permissions, such as what digital resources for which access are requested and the type of and/or conditions associated with the access requested. In various embodiments, the authentication request includes one or more authorized addresses that can provide a valid signature for authenticating the user client associated with the NFT identifier.

Figure 5:
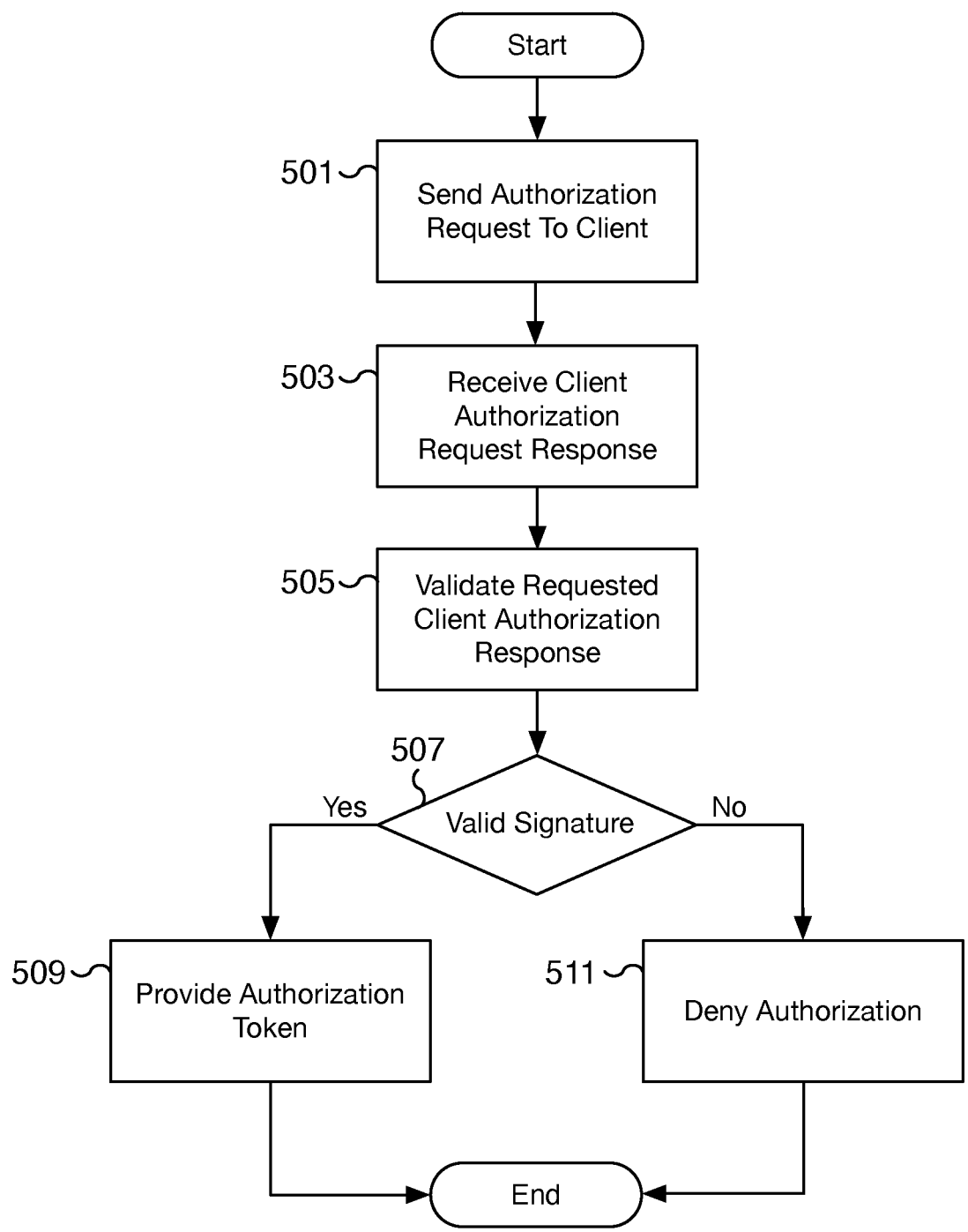
FIG. 5 is a flowchart illustrating an embodiment of a process for authenticating a user using a decentralized user authorization server.

FIG. 5 is a flowchart illustrating an embodiment of a process for authenticating a user using a decentralized user authorization server. For example, in response to an authentication request, a decentralized authorization server contacts a client to validate that the client is the user identified by the authentication request. In various embodiments, the user is identified by an NFT identifier associated with a blockchain token, and the user is authenticated by providing a valid signature associated with the NFT identifier. In some embodiments, the requester is provided with an authentication token when a user is authenticated. In some embodiments, the process of FIG. 5 is performed by a decentralized authorization server such as authorization server 131 of FIG. 1. In some embodiments, the user is a user of client user 101 of FIG. 1, the application server requesting authentication is application server 111 of FIG. 1, and the decentralized authorization server is authorization server 131 of FIG. 1. In some embodiments, the NFT identifier is minted on a blockchain such as blockchain 121 of FIG. 1. In some embodiments, the process of FIG. 5 is performed at 207 of FIG. 2, at 305 of FIG. 3, and/or at 409 of FIG. 4.

At 501, an authorization request is sent to the client. For example, in response to an authorization request by an application server for a specific user client and NFT identifier, the decentralized authorization server constructs and sends an authorization request for a signature to the user client. In various embodiments, the authorization request is a message that the user client authenticates by signing with the appropriate private key configured for the NFT identifier. The message can include the requested permissions for access to digital resources associated with the user and/or NFT identifier.

In various embodiments, different authorization requests are constructed and sent based on the authorization method configured for the NFT identifier. For example, an owner-based or records-based authorization request can be sent depending on how the NFT identifier is configured. In some embodiments, a records-based authorization request allows signatures to be provided using private keys other than an owner key.

At 503, a response to the client authorization request is received. For example, the user client receives the client authorization request and provides a signature. In some embodiments, a message associated with the client authorization request is signed using a cryptographic wallet configured for the NFT identifier and received as part of the response to the client authorization request.

At 505, the requested client authorization response is validated. For example, the client provided signature is validated and verified. In some embodiments, the verification process includes verifying the received signature(s) are correct and match the requested NFT identifier. The provided signature proves that the user possesses a private key authorized by the owner of the NFT identifier. In some embodiments, the signature is the owner signature or another signature authorized by the owner.

At 507, a determination is made whether the provided signature is valid. In the event the provided signature is valid, processing proceeds to 509. In the event the provided signature is not valid, processing proceeds to 511.

At 509, an authorization token is provided. For example, in response to a valid and verified signature for the NFT identifier determined at 505, an authorization token is generated and provided to the application server that requested authentication. In some embodiments, the authentication token is a JSON web token that can be used for OpenID verification and can be provided with a location address to the requested digital resources such as a resource server URL. In various embodiments, the authorization token provides the application server confirmation that the user client is authenticated and grants access to the requested digital resources. In some embodiments, the requested digital resources may be stored and/or accessed from a different server, such as a separate resource server.

At 511, authorization is denied. For example, in response to an invalid signature determined at 505, authorization for the requested digital resources is denied and the application server requesting user authentication is notified accordingly. In some embodiments, the denial response includes additional information related to the cause of the denial.

Figure 6:
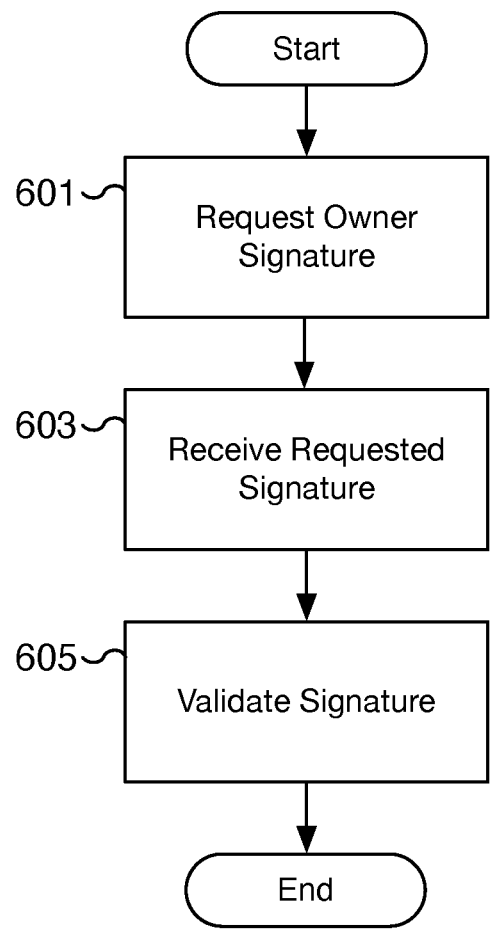
FIG. 6 is a flowchart illustrating an embodiment of a process for authenticating a user associated with an NFT identifier using an owner signature.

FIG. 6 is a flowchart illustrating an embodiment of a process for authenticating a user associated with an NFT identifier using an owner signature. For example, in response to an authentication request, a decentralized authorization server contacts a client to validate that the client is the owner of the provided NFT identifier. In some embodiments, the process of FIG. 6 is performed by a decentralized authorization server such as authorization server 131 of FIG. 1 and the user associated with the NFT identifier is a user of client user 101 of FIG. 1. In some embodiments, the NFT identifier is minted on a blockchain such as blockchain 121 of FIG. 1. In some embodiments, the process of FIG. 6 is performed at 207 of FIG. 2, at 305 of FIG. 3, at 409 of FIG. 4, and/or at 501, 503, and/or 505 of FIG. 5.

At 601, an owner signature is requested. For example, in response to an NFT identifier configured for owner-based authentication, a signature request message is created by the authentication server and sent to the client user. The request message can specify the access permissions that are requested as part of the user authentication process for the corresponding NFT identifier. For example, the message can specify what digital resources for which access is requested along with the access type and conditions.

At 603, the requested signature is received. For example, the requested signature is received in response to the owner signature requested at 601. In various embodiments, the signature corresponds to the user signing the signature request message sent at 601 using the owner's private key associated with the NFT identifier. In some embodiments, the received signature is signed using a cryptographic wallet configured for the NFT identifier using the owner's private key.

At 605, the signature is validated. For example, the signature is validated and verified to confirm that the user has control over the owner's private key associated with the NFT identifier. In various embodiments, the validated signature further indicates that the user is authorized to grant the requested permissions to access the requested digital resources. For example, once the signature is validated, an authorization token can be generated and provided to access the requested digital resources.

Figure 7:
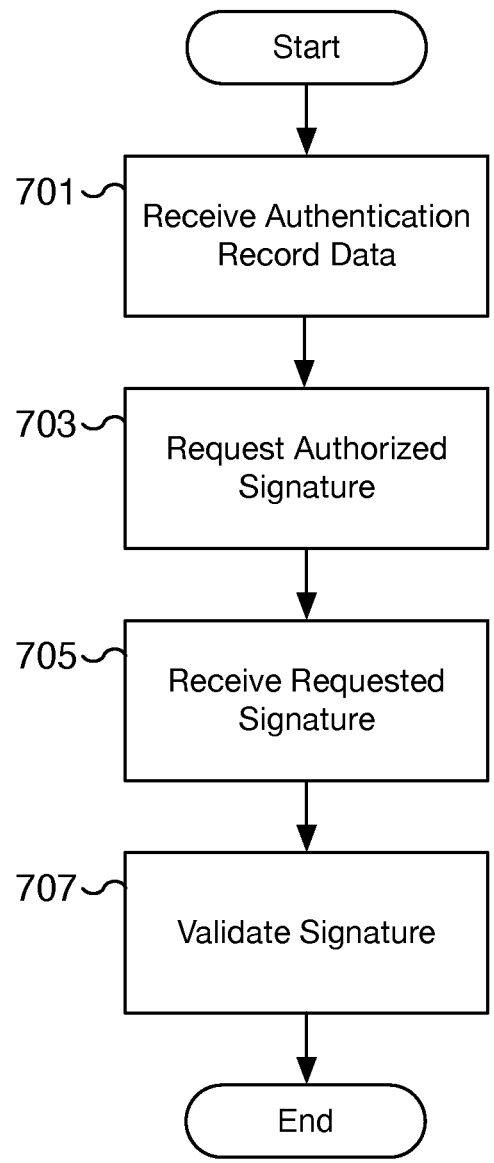
FIG. 7 is a flowchart illustrating an embodiment of a process for authenticating a user associated with an NFT identifier using a non-owner signature.

FIG. 7 is a flowchart illustrating an embodiment of a process for authenticating a user associated with an NFT identifier using a non-owner signature. For example, in response to an authentication request, a decentralized authorization server contacts a client to validate that the client has been granted permission to authenticate the provided NFT identifier. By allowing a non-owner signature to authenticate the NFT identifier, the owner cryptographic keys can be reserved for other uses, such as management of the NFT identifier, and authorized non-owner cryptographic keys can be used for user authentication. In some embodiments, the process of FIG. 7 is performed by a decentralized authorization server such as authorization server 131 of FIG. 1 and the user associated with the NFT identifier is a user of client user 101 of FIG. 1. In some embodiments, the NFT identifier is minted on and authentication configuration for the NFT identifier is stored on a blockchain such as blockchain 121 of FIG. 1. In some embodiments, the process of FIG. 7 is performed at 207 of FIG. 2, at 305 of FIG. 3, at 409 of FIG. 4, and/or at 501, 503, and/or 505 of FIG. 5.

At 701, authentication record data is received. For example, in response to an NFT identifier configured for non-owner signature authentication, authentication record data corresponding to the authentication method configuration of the NFT identified is received. In some embodiments, the non-owner signature authentication is a record-based authentication method where one or more authentication records specify alternative authorization methods including non-owner cryptographic keys authorized to authenticate and grant access to digital resources for the NFT identifier. Using the received authentication record data, the non-owner signatures that have been approved to authenticate for the NFT identifier are determined. In some embodiments, authentication record data can specify the non-owner signatures in a variety of formats including by storing the data or references to the data on the blockchain. For example, the authentication record data can specify an Ethereum address corresponding to an authorized private key along with other parameters such as parameters related to the medium for signing. The medium for signing can include an injected Web3 instance as well as different cryptographic wallets and out-of-band signing, among other options. In some embodiments, the authentication record data can specify an authorized private key using a JSON Web Key Set (JWKS). For example, an authentication record can include a JWKS storing the signing keys by value or by reference.

At 703, an authorized signature is requested. For example, a signature request message is created by the authentication server and sent to the client user. The request message can specify the access permissions that are requested as part of the user authentication process for the corresponding NFT identifier. For example, the message can specify what digital resources for which access are requested along with the access type and conditions. The signature request is generated for an authorized signature that is a non-owner signature using the authentication configuration information received at 701.

At 705, the requested signature is received. For example, the requested signature is received in response to the authorized signature requested at 703. In various embodiments, a non-owner signature is received, and the non-owner signature corresponds to the user signing the authorized signature request message sent at 703 using an authorized private key associated with the NFT identifier. In some embodiments, the received signature is signed using a cryptographic wallet configured for the NFT identifier using an approved and authorized non-owner private key.

At 707, the signature is validated. For example, the non-owner signature is validated and verified to confirm that the user has been authorized to sign for the NFT identifier as a non-owner. In various embodiments, the validated signature further indicates that the user is authorized to grant the requested permissions to access the requested digital resources. For example, once the non-owner signature is validated, an authorization token can be generated and provided to access the requested digital resources.

Figure 8:
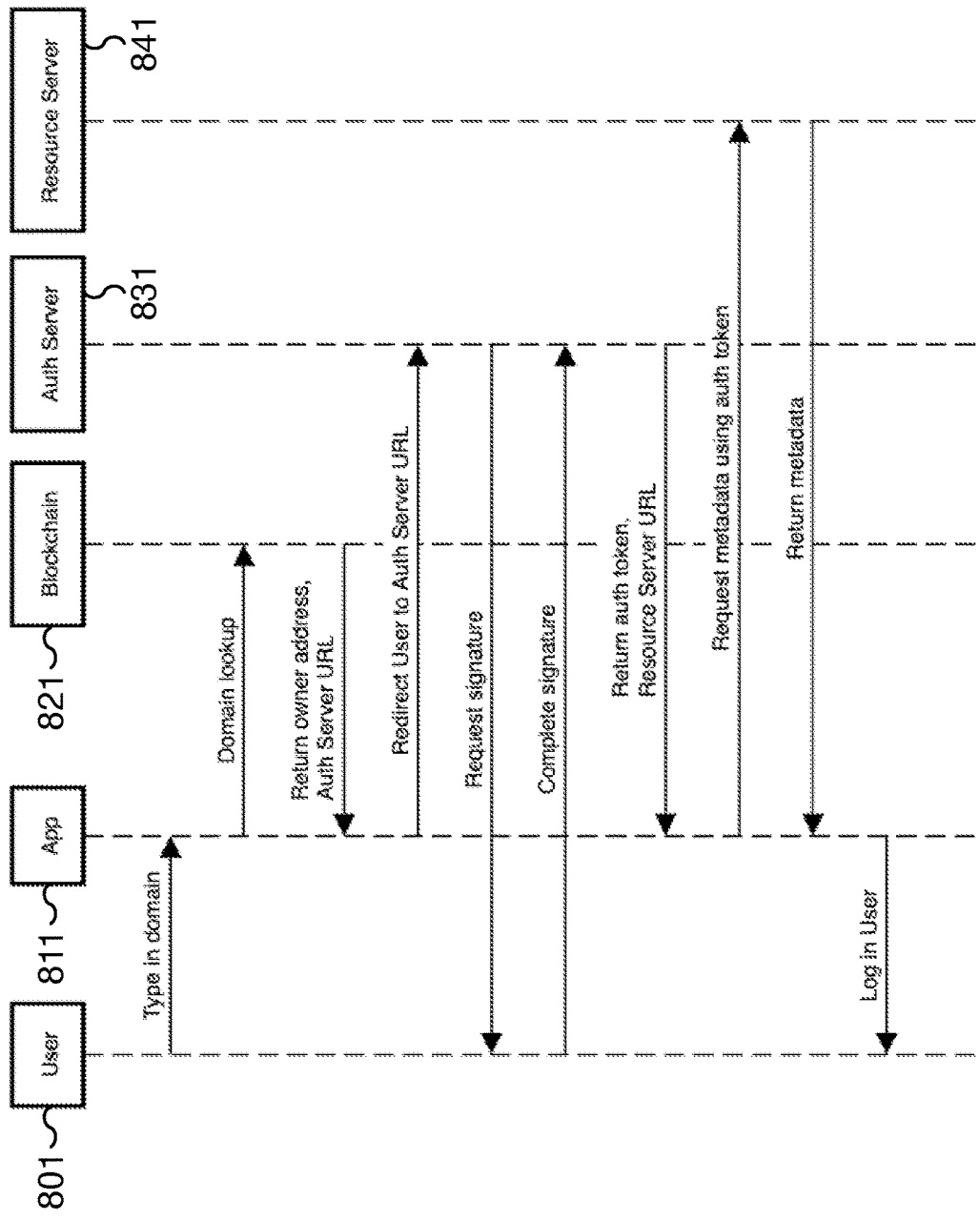
FIG. 8 is a flow diagram illustrating an embodiment of authenticating a user to an application server using a decentralized authorization server.

FIG. 8 is a flow diagram illustrating an embodiment of authenticating a user to an application server using a decentralized authorization server. In the diagram shown, the communication between different components of a decentralized authorization platform are shown from top to bottom with the first step of the process starting at the top of the flow diagram. As shown in FIG. 8, the components of the decentralized authorization platform include user 801, application 811, blockchain 821, authorization server 831, and resource server 841. The process shown in the flow diagram corresponds to user 801 providing an NFT identifier for authentication with application server 811 using decentralized authorization server 831. The blockchain token and records associated with the provided NFT identifier are stored on blockchain 821. Once user 801 is authenticated, application server 811 can access digital resources associated with user 801 from resource server 841 and allow user 801 to log in to an account associated with user 801. In some embodiments, user 801, application 811, blockchain 821, authorization server 831, and resource server 841 correspond to client user 101, application server 111, blockchain 121, authorization server 131, and resource server 141 of FIG. 1, respectively. In various embodiments, the different communication steps of the flow diagram of FIG. 8 correspond to the various processes of FIGS. 2-7 and their steps.

FIG. 9 is a diagram of an embodiment of WebFinger blockchain domain records. In the example shown, the diagram illustrates WebFinger blockchain records implemented by request, by reference, and by value. The entry associated with "alice" is implemented by reference and uses the "uri" field. The entry associated with "bob" is implemented by request and uses the "host" field. The entry associated with "charlie" is implemented by value and, although not shown in the diagram, includes the WebFinger JRD document inserted by value (in place of " . . . Webfinger JRD Doc . . . ").

FIG. 10 is a diagram of an embodiment of WebFinger DNS Records. In the example shown, the DNS record has name "webfinger" and type "TXT." Although not shown in FIG. 10, the value field includes the BASE64 encoded document of FIG. 9.

In various embodiments, the diagrams of FIGS. 9 and 10 are used to specify a decentralized authorization server. For example, in some embodiments, the WebFinger information shown in FIGS. 9 and 10 are utilized at 205 of FIG. 2 and/or at 403 and/or 405 of FIG. 4 to configure and determine an authorization server to authenticate a user associated with an NFT identifier, such as an NFT domain.

In some embodiments, the disclosed decentralized authorization service utilizes an OpenID Connect Relying Party (RP). The RP utilizes OpenID Connect services for an End-User. The RP can determine the OpenID Provider using OpenID Connect Discovery. The extension provides a method for OpenID Connect Issuer Discovery.

In some embodiments, the relevant WebFinger information is not resolved from a server as described in the OpenID Connect website document. Instead, clients resolve the WebFinger information using records stored on a domain name, allowing an End-User to specify their OpenID Provider(s) using their domains. For example, the WebFinger information can be stored as a record based on a non-fungible token (NFT), such as an NFT domain or an NFT identifier.

In the disclosed embodiments, a variety of records may be stored on and/or associated with an NFT domain to resolve a WebFinger Issuer discovery request. For example, there are a variety of ways that WebFinger information can be stored on an NFT domain. Example techniques include by request, by record, and by value.

For reference, in various embodiments, WebFinger uses the following information to make a discovery request: resource, host, and rel. A resource is an identifier for the target End-User that is the subject of the discovery request. A host is a server where a WebFinger service is hosted. A rel is a URI that identifies the type of service whose location is being requested. For example, a traditional issuer discovery requires only the requestor resource and host to form the request, and the rel must be http://openid.net/specs/connect/1.0/issuer to make an issuer request.

As described above, there are a variety of different methods that WebFinger information can be stored on an NFT domain. In some embodiments, WebFinger information can be stored on an NFT domain by request. Using the "by request" technique, a WebFinger request can be constructed. For example, in some embodiments, user, host, and rel fields are used to construct a WebFinger request that a Client can resolve. A user is an optional user of the account. For example, if resolving this information on domain.tld, the WebFinger resource constructed would be acct:user@domain.tld. If no user is present in the record, the account would be the domain itself, i.e., acct:@domain.tld. A host is a server where a WebFinger service is hosted. A rel is an optional URI that identifies the type of service whose location is being requested. In some embodiments, rel defaults to http://openid.net/specs/connect/1.0/issuer. In some embodiments, an issuer discovery component such as Unstoppable Issuer Discovery utilizes this default value.

In some embodiments, WebFinger information can be stored on an NFT domain by reference. Using the "by reference" technique, a WebFinger request can be constructed. For example, in some embodiments, the user, uri, and rel fields are used to construct a WebFinger request that a Client can resolve. A user is an optional user of the account. In various embodiments, the user field is interpreted as described with respect to the "By Request" technique. A uri is a URI specifying the location of a WebFinger JRD Document. This can be an HTTPS scheme URL, a decentralized identifier (DID), a decentralized storage URL, or another appropriate URI format. A rel is an optional URI that identifies the type of service whose location is being requested. In various embodiments, the rel field is interpreted as described with respect to the "By Request" technique.

In some embodiments, WebFinger information can be stored on an NFT domain by value. Using the "by value" technique, a WebFinger request can be constructed. For example, in some embodiments, the user, value, and rel fields are used to construct a WebFinger request that a Client can resolve. A user is an optional user of the account. In various embodiments, the user field is interpreted as described with respect to the "By Request" technique. A value is WebFinger JRD Document in plaintext. A rel is an optional URI that identifies the type of service whose location is being requested. In various embodiments, the rel field is interpreted as described with respect to the "By Request" technique.

FIG. 11 is a diagram of an embodiment of authentication blockchain domain records. In the example shown, the diagram illustrates authentication blockchain domain records used to authorize non-owner signatures for authentication for an NFT identifier. The non-owner public keys and/or addresses are described by Ethereum address, using JWKS by value, and using JWKS by reference. The entry associated with "alice" is implemented by Ethereum address and uses the "addr" and "addr_type_hint" fields. The entry associated with "bob" is implemented using JWKS by value and uses the "jwks" field. Although not shown in the diagram, the entry for "bob" includes the JWKS document in plaintext containing the signing keys as the value for the field "jwks" (in place of "[ . . . ]"). The entry associated with "charlie" is implemented using JWKS by reference and uses the "jwks_uri" field. In some embodiments, the authentications records of FIG. 11 are utilized at 205 of FIG. 2 and/or at 403 and/or 407 of FIG. 4 to configure and determine an authorization method to authenticate a user associated with an NFT identifier, such as an NFT domain.

In various embodiments, a group of or multiple methods are supported for authenticating End-Users of blockchain-based domain names. For example, both owner-based authentication and record-based authentication can be supported. In various embodiments, the metadata encoded inside a JSON Web Token (JWT) uses Authentication Method Reference (AMR) Values.

Owner-Based Authentication

In some embodiments, owner-based authentication is utilized. In the context of owner-based authentication, to consent to authentication, a user signs a message that an authentication or authorization server provides. Instead of using a username and password, the owner of the non-fungible token (NFT), such as an NFT domain or an NFT identifier, is used as the public key that is recovered. For example, the private/public key pair associated with the owner of the NFT is used for authentication. In some embodiments, the authentication or authorization server uses the AMR Value of uns-own. In some embodiments, the default authentication method used is owner-based authentication. The process of FIG. 6 corresponds to steps performed as part of implementing an owner-based authentication method.

Record-Based Authentication

In some embodiments, record-based authentication is utilized. For example, for a non-fungible token (NFT) that is owned by a multi-signature or multisig wallet, there is no private key associated with the owner account and owner-based authentication is insufficient. In various embodiments, the NFT, such as an NFT domain or an NFT identifier, can specify a private key using an associated record. For example, an NFT domain can specify a private key as a record on the NFT domain. The private key and associated public key can be used for authentication. The process of FIG. 7 corresponds to steps performed as part of implementing a record-based (or non-owner-based) authentication method.

In various embodiments, the below fields are used to specify a public key that can be used for authentication. In some embodiments, users are recommended to support, at the minimum, the web3 and oob methods.

| Ethereum Address |
| --- |
| user |
|     The OPTIONAL user of the account. If one was resolving this information on domain.tld, the Webfinger resource constructed would be acct:user@domain.tld. If no user is present in the record, the account would be the domain itself, i.e., acct:@domain.tld. |
| addr |
|     An Ethereum address corresponding to a private key a user owns. |
| addr_type_hint |
|     An OPTIONAL hint for the authentication or authorization server to suggest sign-in methods. If no hint is present the authentication/authorization server displays as many methods as it can support. |
|     addr_type_hint can have the following values: |
|       web3 |
|         Signing done via injected web3 instance |
|       Trezor |
|         Signing done via Trezor Wallet. This method is considered uns-hwk |
|       ledger |
|         Signing done via Ledger Wallet. This method is considered uns-hwk |
|       walletconnect |
|         Signing done via Wallet Connect Modal |
|       walletlink |
|         Signing done via Wallet Link Modal |
|       mewconnect |
|         Signing done via My Ether Wallet Connect. This method is used by their mobile app |
|       formatic |
|         Signing done via Formatic Wallet |
|       portis |
|         Signing done via Portis Wallet |
|       oob |
|         Signing done via Out of Band signing. The authorization server displays a message to sign and provides a form for the user to paste the corresponding signature for authentication. |

In various embodiments, if the Ethereum account is stored using a hardware wallet, the AMR Value is uns-hwk. For all other address types, the authentication/authorization server uses the AMR Value uns-swk.

In some embodiments, JSON Web Key Set (JWKS) can be utilized by value or by reference. The following fields can be utilized for each approach. In various embodiments, the authentication/authorization server uses the AMR Value of uns-swk.

Figure 12:
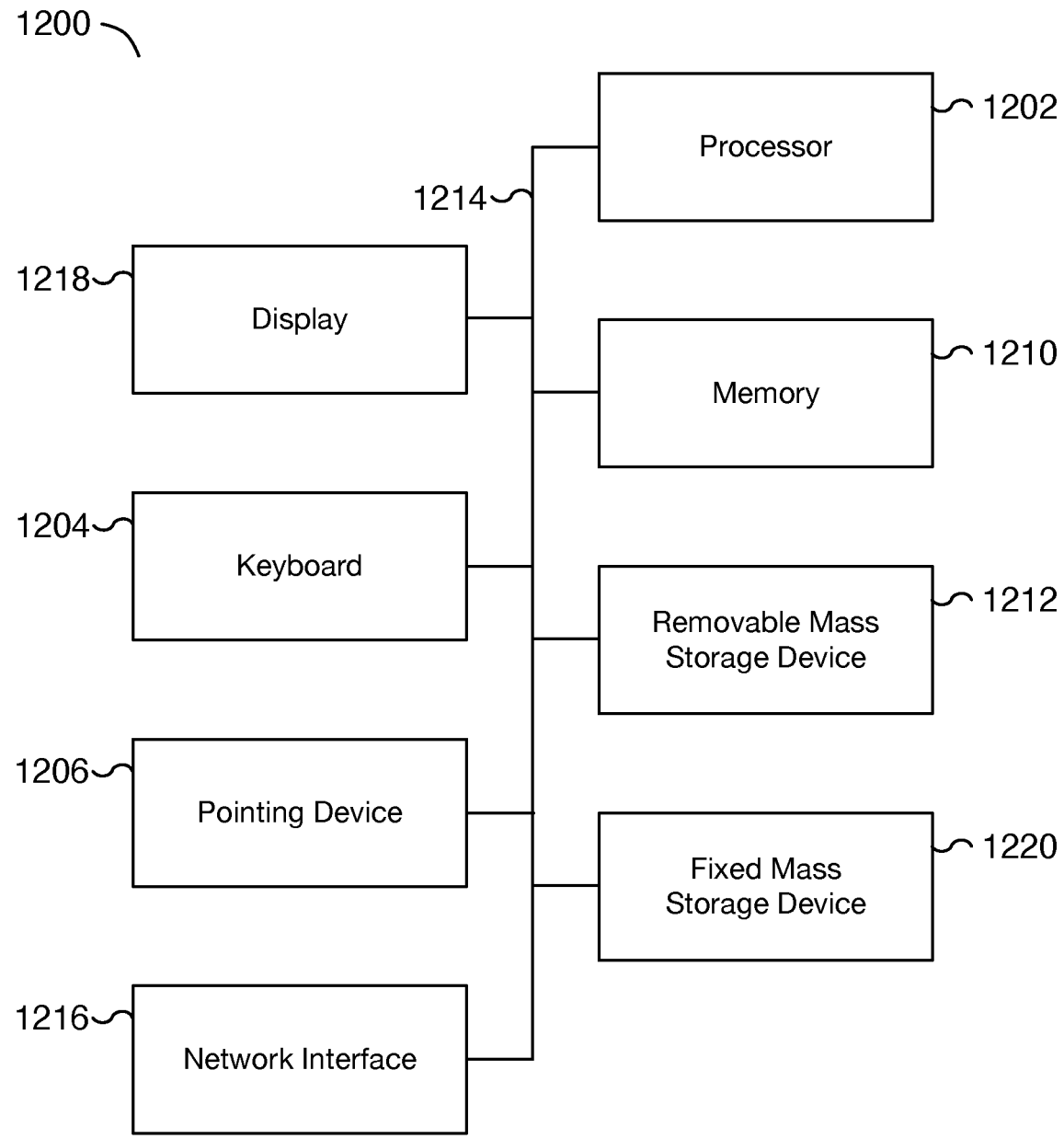
FIG. 12 is a functional diagram illustrating a programmed computer system for performing decentralized authorization in accordance with some embodiments.

JWKS by Value
  user
    The OPTIONAL user of the account. This is interpreted in the same way as described above with respect to the Ethereum Address user field.
  jwks
    A JWKS document stored in plaintext containing the signing key(s) used to prove the identity of the End-User JWKS by Reference
  user
    The OPTIONAL user of the account. This is interpreted in the same way as described above with respect to the Ethereum Address user field.
  jwk_uri
    URL of the JWKS document containing the signing key(s) used to prove the identity of the End-User FIG. 12 is a functional diagram illustrating a programmed computer system for performing decentralized authorization in accordance with some embodiments. As will be apparent, other computer system architectures and configurations can be utilized for performing decentralized authorization. Examples of computer system 1200 include client user 101 of FIG. 1, one or more computers included in application server 111 of FIG. 1, one or more computers included in blockchain 121 of FIG. 1, one or more computers included in authorization server 131 of FIG. 1, and one or more computers included in resource server 141 of FIG. 1. Computer system 1200, which includes various subsystems as described below, includes at least one microprocessor subsystem (also referred to as a processor or a central processing unit (CPU)) 1202. For example, processor 1202 can be implemented by a single-chip processor or by multiple processors. In some embodiments, processor 1202 is a general purpose digital processor that controls the operation of the computer system 1200. Using instructions retrieved from memory 1210, the processor 1202 controls the reception and manipulation of input data, and the output and display of data on output devices (e.g., display 1218). In various embodiments, one or more instances of computer system 1200 can be used to implement at least portions of the processes of FIGS. 2-7 and the communication steps of the flow diagram of FIG. 8.

Processor 1202 is coupled bi-directionally with memory 1210, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1202. Also as is well known in the art, primary storage typically includes basic operating instructions, program code, data and objects used by the processor 1202 to perform its functions (e.g., programmed instructions). For example, memory 1210 can include any suitable computer-readable storage media, described below, depending on whether, for example, data access needs to be bi-directional or unidirectional. For example, processor 1202 can also directly and very rapidly retrieve and store frequently needed data in a cache memory (not shown).

A removable mass storage device 1212 provides additional data storage capacity for the computer system 1200, and is coupled either bi-directionally (read/write) or unidirectionally (read only) to processor 1202. For example, storage 1212 can also include computer-readable media such as magnetic tape, flash memory, PC-CARDS, portable mass storage devices, holographic storage devices, and other storage devices. A fixed mass storage 1220 can also, for example, provide additional data storage capacity. The most common example of mass storage 1220 is a hard disk drive. Mass storages 1212, 1220 generally store additional programming instructions, data, and the like that typically are not in active use by the processor 1202. It will be appreciated that the information retained within mass storages 1212 and 1220 can be incorporated, if needed, in standard fashion as part of memory 1210 (e.g., RAM) as virtual memory.

In addition to providing processor 1202 access to storage subsystems, bus 1214 can also be used to provide access to other subsystems and devices. As shown, these can include a display monitor 1218, a network interface 1216, a keyboard 1204, and a pointing device 1206, as well as an auxiliary input/output device interface, a sound card, speakers, and other subsystems as needed. For example, the pointing device 1206 can be a mouse, stylus, track ball, or tablet, and is useful for interacting with a graphical user interface.

The network interface 1216 allows processor 1202 to be coupled to another computer, computer network, or telecommunications network using a network connection as shown. For example, through the network interface 1216, the processor 1202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1202 can be used to connect the computer system 1200 to an external network and transfer data according to standard protocols. For example, various process embodiments disclosed herein can be executed on processor 1202, or can be performed across a network such as the Internet, intranet networks, or local area networks, in conjunction with a remote processor that shares a portion of the processing. Additional mass storage devices (not shown) can also be connected to processor 1202 through network interface 1216.

An auxiliary I/O device interface (not shown) can be used in conjunction with computer system 1200. The auxiliary I/O device interface can include general and customized interfaces that allow the processor 1202 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 12 is but an example of a computer system suitable for use with the various embodiments disclosed herein. Other computer systems suitable for such use can include additional or fewer subsystems. In addition, bus 1214 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
  receiving a non-fungible token domain name identifier associated with an authorized user requesting to log in to access a service;
  resolving the non-fungible token domain name identifier including by using the non-fungible token domain name identifier to find on a blockchain registry a cryptographic address associated with a blockchain token mapped to the non-fungible token domain name identifier;
  based on the cryptographic address of the blockchain token, resolving an authorization server using one or more dynamically updateable blockchain-stored resource records that specify the authorization server and a cryptographic key associated with a cryptographically generated signature associated with the authorized user of the blockchain token;
  contacting the authorization server that verifies the signature associated with the authorized user of the blockchain token;
  receiving an authorization from the authorization server that verified the signature; and based on the received authorization, allowing the authorized user of the blockchain token to log in to the service.

2. The method of claim 1, wherein receiving the authorization includes receiving an authorization token.

3. The method of claim 2, wherein the service accesses a digital resource of the authorized user of the blockchain token using the authorization token.

4. The method of claim 3, wherein the digital resource is an email address, an account balance, a history of user activity, an account profile, a user social media account, or user reputation metrics.

5. The method of claim 1, wherein a record of the one or more blockchain-stored resource records associated with the non-fungible token domain name identifier specifies a network address of the authorization server.

6. The method of claim 1, wherein the blockchain token is associated with an authentication record of the one or more blockchain-stored resource records identifying one or more public cryptographic keys.

7. The method of claim 6, wherein the authentication record is updated to add a new public cryptographic key to be used to verify a new authorized signature for the non-fungible token domain name identifier of the blockchain token.

8. The method of claim 1, wherein a cryptographic wallet is utilized to create the signature associated with the authorized user of the blockchain token.

9. The method of claim 1, wherein contacting the authorization server includes providing a request that specifies a digital resource of the authorized user of the blockchain token.

10. The method of claim 9, wherein the request includes one or more access conditions or one or more access types associated with the digital resource.

11. A system, comprising:
one or more processors; and
a memory coupled to the one or more processors, wherein the memory is configured to provide the one or more processors with instructions which when executed cause the one or more processors to:
receive a non-fungible token domain name identifier associated with an authorized user requesting to log in to access a service;
resolve the non-fungible token domain name identifier including by being configured to use the non-fungible token domain name identifier to find on a blockchain registry a cryptographic address associated with a blockchain token mapped to the non-fungible token domain name identifier;
based on the cryptographic address of the blockchain token, resolve an authorization server using one or more dynamically updateable blockchain-stored resource records that specify the authorization server and a cryptographic key associated with a cryptographically generated signature associated with the authorized user of the blockchain token;
contact the authorization server that verifies the signature associated with the authorized user of the blockchain token;
receive an authorization from the authorization server that verified the signature; and
based on the received authorization, allow the authorized user of the blockchain token to log in to the service.

12. The system of claim 11, wherein receiving the authorization includes receiving an authorization token.

13. The system of claim 12, wherein the service accesses a digital resource of the authorized user of the blockchain token using the authorization token.

14. The system of claim 13, wherein the digital resource is an email address, an account balance, a history of user activity, an account profile, a user social media account, or user reputation metrics.

15. The system of claim 11, wherein a record of the one or more blockchain-stored resource records associated with the non-fungible token domain name identifier specifies a network address of the authorization server.

16. The system of claim 11, wherein the blockchain token is associated with an authentication record of the one or more blockchain-stored resource records identifying one or more public cryptographic keys.

17. The system of claim 16, wherein the authentication record is updated to add a new public cryptographic key to be used to verify a new authorized signature for the non-fungible token domain name identifier of the blockchain token.

18. The system of claim 11, wherein a cryptographic wallet is utilized to create the signature associated with the authorized user of the blockchain token.

19. The system of claim 11, wherein contacting the authorization server includes providing a request that specifies a digital resource of the authorized user of the blockchain token.

20. A computer program product, the computer program product being embodied in a non-transitory computer readable storage medium and comprising computer instructions for:
receiving a non-fungible token domain name identifier associated with an authorized user requesting to log in to access a service;
resolving the non-fungible token domain name identifier including by using the non-fungible token domain name identifier to find on a blockchain registry a cryptographic address associated with a blockchain token mapped to the non-fungible token domain name identifier;
based on the cryptographic address of the blockchain token, resolving an authorization server using one or more dynamically updateable blockchain-stored resource records that specify the authorization server and a cryptographic key associated with a cryptographically generated signature associated with the authorized user of the blockchain token;
contacting the authorization server that verifies the signature associated with the authorized user of the blockchain token;
receiving an authorization from the authorization server that verified the signature; and
based on the received authorization, allowing the authorized user of the blockchain token to log in to the service.

* * * * *